United States Patent [19]
Carter, Jr.

[11] Patent Number: 5,137,554
[45] Date of Patent: Aug. 11, 1992

[54] CYCLONIC VACUUM CLEANER CONE

[75] Inventor: Norwood S. Carter, Jr., Harrells, N.C.

[73] Assignee: Fasco Industries, Inc., Fayetteville, N.C.

[21] Appl. No.: 756,722

[22] Filed: Sep. 9, 1991

[51] Int. Cl.$^5$ ............................................. B01D 45/12
[52] U.S. Cl. ........................................ 55/399; 55/459.1
[58] Field of Search ................... 55/399, 459.1, 459.2, 55/459.3, 459.4

[56] References Cited

U.S. PATENT DOCUMENTS

| | | | |
|---|---|---|---|
| 471,272 | 3/1892 | Morse | 55/399 |
| 2,320,343 | 6/1943 | Bailey | 55/399 |
| 2,351,864 | 6/1944 | Linderman | 55/399 X |
| 4,251,243 | 2/1981 | Salete-Garces | 55/459.1 X |
| 4,510,056 | 4/1985 | Frykhult et al. | 55/399 X |

Primary Examiner—Charles Hart
Attorney, Agent, or Firm—Shlesinger, Fitzsimmons & Shlesinger

[57] ABSTRACT

A one-piece, truncated conical annulus or dust separator body is molded from a high impact polystyrene material in such manner that a narrow rib is formed on the inner conical surface of the body to extend continuously in a spiral path from the larger to the smaller end thereof. A flange on its larger end is used to support the body in a vacuum cleaner chamber above a dust collecting canister. Dust-laden air enters the upper end of the body tangentially and cyclonically so that dust particles are urged outwardly by centrifugal forces, and are fed by the spiral rib downwardly into the canister.

4 Claims, 2 Drawing Sheets

CYCLONIC VACUUM CLEANER CONE

BACKGROUND OF THE INVENTION

This invention relates to a dust collecting apparatus, such as a vacuum cleaner, and more particularly to a device to be used in such a dust collecting apparatus. Even more particularly, this invention relates to an improved cyclonic vacuum cleaner cone which effectively conducts particles of debris inside of a dust collecting apparatus.

Conventional dust collecting devices usually filter the dust laden air through mesh fabric bags before returning air to the surrounding environment. Frequent use tends eventually to cake the filtering surface of the mesh fabric bag with debris, thus decreasing the efficiency of the bag and allowing particles to be transmitted to the surrounding environment. This is potentially hazardous since particles may become suspended in the air, and not to mention, the filter bag must be changed more frequently.

In response to this problem, it heretofore has been customary to introduce a pre-filter separator means in order to clean the air prior to filtering. Such means generally comprise a helical debris conducting device either mounted within a conical separator, as in U.S. Pat. No. 3,618,302, or attached directly to the walls of an internal chamber of the apparatus, as in U.S. Pat. No. 2,333,961. Although these devices effectively separate debris from air, manufacturing of the separate parts leads to an increased production cost due to both fabrication of the part and assembly of the unit.

It is therefore an object of this invention to provide an improved uni-body construction for a debris conducting device to be used in a dust collecting apparatus.

It is also an object of this invention to provide a low cost method of producing such a device.

Other objects of this invention will become apparent when the preferred embodiments of this invention are considered in conjunction with the accompanying drawings.

SUMMARY OF THE INVENTION

Each debris conducting device preferably is manufactured utilizing an injection molding process for high impact polystyrene, or the like. The size of the device will, of course, vary depending upon the size and power of the dust collecting apparatus. The debris conducting device is, generally, a truncated conical funnel whose upper, diametrally larger end possesses a circumferential lip necessary for mounting the device within a chamber of a dust collecting apparatus. At its lower, diametrally smaller end, where the conical device has been truncated, the cone opens directly into a dust collecting chamber.

The helical debris conducting surface consists of a molded internal protrusion which extends from the uppermost circumferential lip to the lowermost opening. Due to its shape and the cyclonic turbulence of the air, the helical debris conducting surface will collect air-borne particles and conduct them down its length to the dust collecting chamber. This pre-cleaning of air will contribute to a greater efficiency of the air filtering process.

PREFERRED EMBODIMENTS OF THE INVENTION

Figure 1:
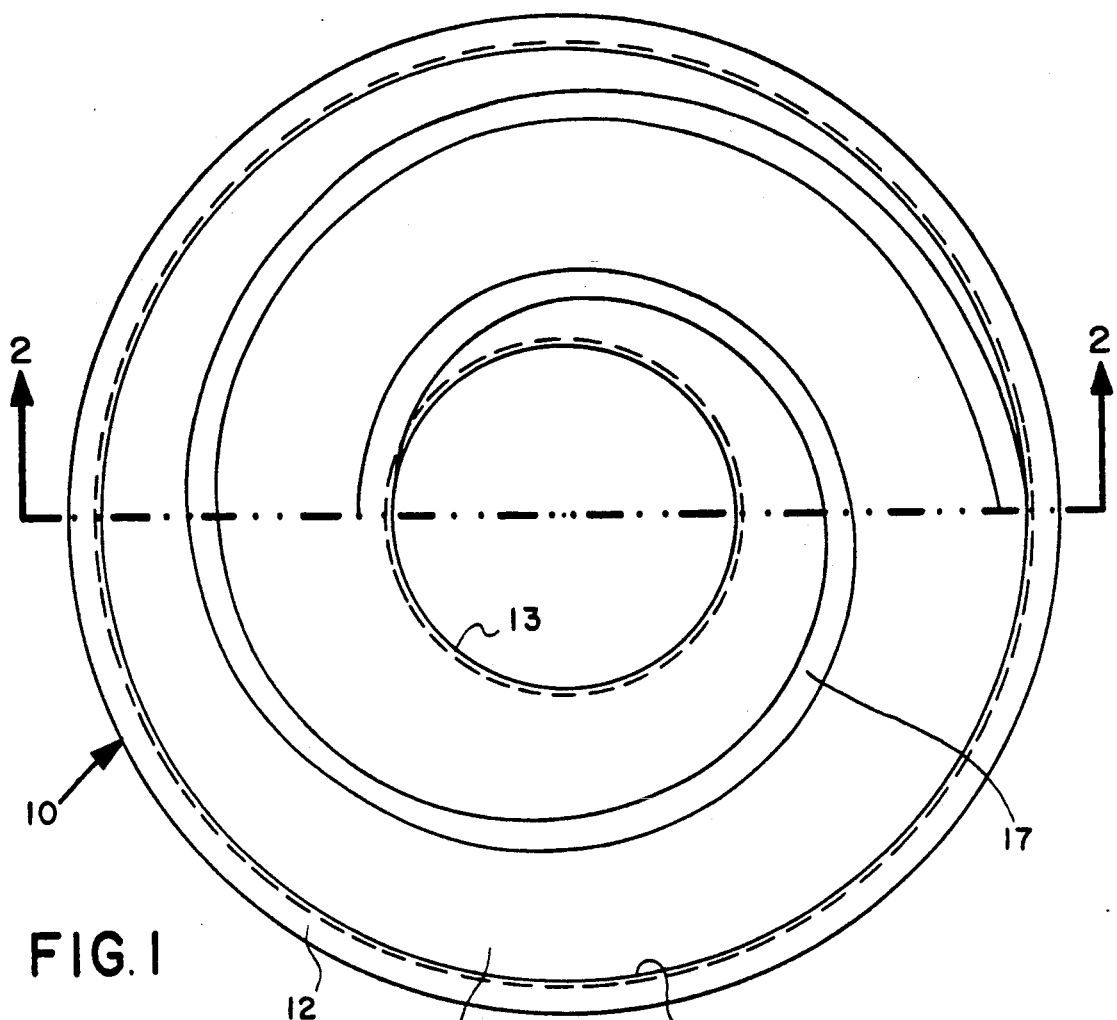
FIG. 1 is a plan view of a debris collecting device made according to one embodiment of this invention.
Figure 2:
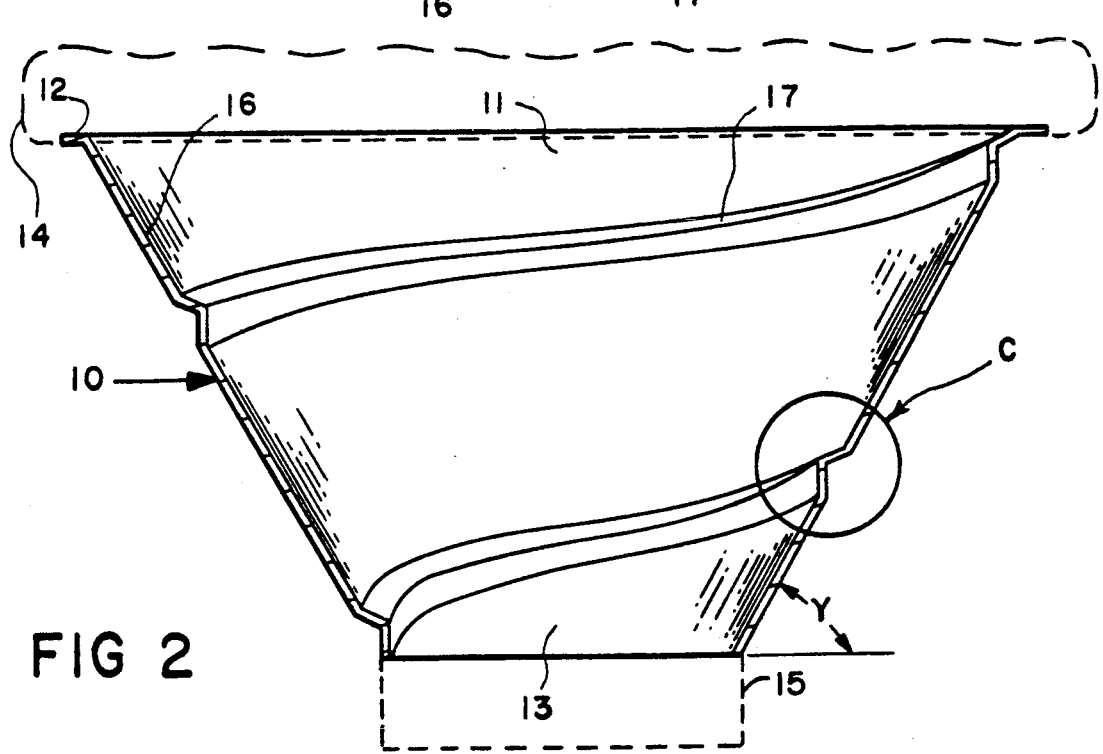
FIG. 2 is a sectional view of the device taken along the line 2—2 in FIG. 1 looking in the direction of the arrows.

Referring now to the drawings by numerals of reference, the novel debris collecting device is comprised of a single, truncated conical annulus or body, which is denoted generally by the numeral 10. Body 10 has therethrough an axial bore that is also truncated conical in configuration; and because it is intended to be used in conjunction with dust collecting apparatus, such as for example a vacuum cleaner, it has around its larger end 11 (the upper end in FIGS. 1 and 2) an integral, outwardly projecting circumferential flange 12. This flange serves as a means to mount the device in a chamber 14 (broken lines in FIG. 2) above the dust collecting canister 15 (broken lines in FIG. 2) of a conventional vacuum cleaner or the like, and with the lower, diametrally smaller end 13 of body 10 disposed in communication with the interior of canister 15. The internal surface 16 of the annulus or body 10 is smooth, except for a debris conducting surface in the form of a molded, internal, spiral rib or protrusion 17, which behaves as a deflector. Rib 17 extends down the entire length of conical body 10 at an angle of approximately 12° to the horizontal, and completes one and one half revolutions along its downward, counterclockwise (FIG. 1) spiral path.

In operation, dust laden air is drawn into a dust collecting apparatus (not shown) by means of a suction device acting through a hose, thereby causing dust-laden air to enter tangentially into the larger end 11 of the conical body 10. As the air flows downwardly through the body 10, it accelerates more rapidly due to the shrinking diameter of the inner conical wall 16. This acceleration of the air causes it to form a vortex in body 10, and imparts an increasing centrifugal force upon the particles of dust or debris in the air, thereby causing such particles to become impinged against the inner conical wall 16. As gravity and the air currents carry the debris downwardly, the particles reach deflector 17 where they congregate while being conducted by the deflector i a spiral path toward the diametrally smaller end 13 of body 10. When the turbulent air and dust particles reach the open end 13, the air is allowed to expand to fill the entire dust collecting canister, thus reducing its force upon the dust particles, and allowing them to drop into or otherwise to accumulate at the bottom of the canister. The air and any remaining airborne particles will then pass through a filter prior to return of the filtered air to the surrounding environment.

Figure 3:
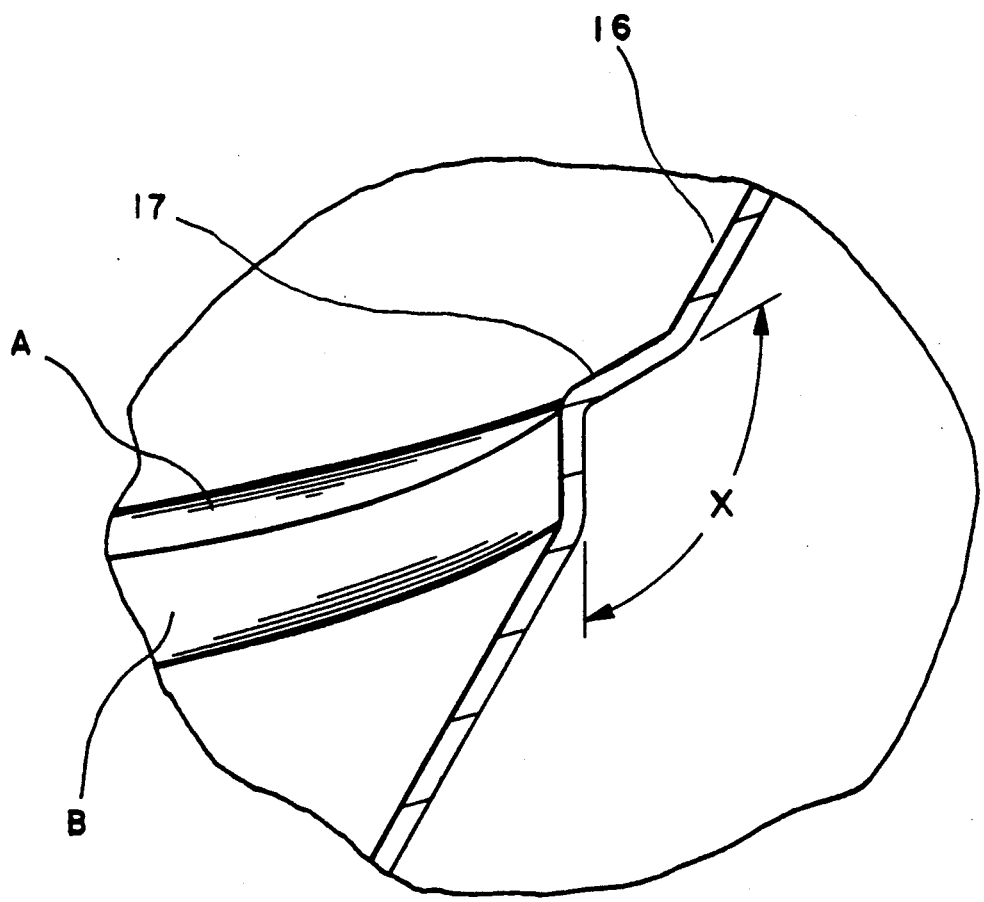
FIG. 3 is a greatly enlarged view of that portion of the sectional view in FIG. 2 enclosed by the circle C.

Referring now to FIG. 3, it has been discovered that a particularly effective cone utilizes a deflector rib 17 which is generally V-shaped in cross section, the included angle X measuring approximately 120°, and the intersecting sides A and B of the rib 17 being substantially equal in width. Moreover, in the illustrated embodiment, the cone angle Y (FIG. 2) is approximately 60° to the horizontal, while the overall height of the cone 10 is approximately 7.5", whereby the rib 17 makes approximately one revolution per 5 inches of axial length of the body or annulus 10.

From the foregoing, it will be apparent that the present invention provides an improved, cyclonic vacuum cleaner cone which is substantially less expensive to produce and assemble as compared to prior such devices, and is readily modifiable to accommodate different vacuum cleaning apparatus. The improved device, which preferably is molded in one piece from a high impact polystyrene material, is not only simpler to manufacture than prior separator devices, but also facilitates easier cleaning of the entire dust collecting apparatus, and its subsequent re-assembly.

While this invention has been illustrated and described in detail in connection with only certain embodiments thereof, it will be apparent that it is capable of still further modification, and that this application is intended to cover any such modifications as may fall within the scope of one skilled in the art or the appended claims.

I claim:

1. In combination with dust collecting apparatus of the type having a dust canister, and suction means for drawing air-borne dust particles tangentially into a chamber above said canister, a dust separating device in said chamber, comprising a one-piece separator body having therethrough an axial bore which is generally truncated conical in configuration, said bore defining in said body an internal conical surface having a larger end opening on one end of said body, and a smaller end opening on the opposite end of said body, flange means on said body adjacent said one end thereof for supporting said body in said chamber with said larger end of said conical surface positioned to have said air-borne dust particles enter said larger end tangentially, and with the smaller end of said conical surface communicating with the interior of said canister, and an integral rib projecting radially inwardly from said internal conical surface of said body, and extending continuously in a spiral path at an angle of approximately 12°, and for approximately one and one-half revolutions between said larger and smaller end, respectively, of said conical surface, said rib being generally V-shaped in cross section, and having intersecting sides that are substantially equal in width.

2. In the combination as defined in claim 1, wherein said body is a hollow annulus both the internal and external surfaces of which are generally truncated conical configuration, and said rib is formed in said body by creating in the outer surface of said body a spiral recess similar in configuration to said rib.

3. In the combination as defined in claim 7, wherein said body is molded from a high impact polystyrene material.

4. In the combination as defined in claim 1, wherein the rib extends in said spiral path counterclockwise from said larger to said smaller end of said body.

* * * * *